US009453740B2

(12) United States Patent
Nguyen

(10) Patent No.: US 9,453,740 B2
(45) Date of Patent: Sep. 27, 2016

(54) METHOD OF DISPLAYING OBJECTS ON NAVIGATION MAP

(71) Applicant: Truc Nguyen, Torrance, CA (US)

(72) Inventor: Truc Nguyen, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 915 days.

(21) Appl. No.: 13/664,019

(22) Filed: Oct. 30, 2012

(65) Prior Publication Data

US 2014/0123062 A1  May 1, 2014

(51) Int. Cl.
G06F 3/048 (2013.01)
G01C 21/36 (2006.01)

(52) U.S. Cl.
CPC ....... G01C 21/3611 (2013.01); G01C 21/3682 (2013.01)

(58) Field of Classification Search
CPC ............ G01C 21/3682; G01C 21/367; G06F 17/30241; G06F 17/3087
USPC ........................................................ 715/827
See application file for complete search history.

(56) References Cited

U.S. PATENT DOCUMENTS

| 6,489,976 | B1* | 12/2002 | Patil ..................... G06F 3/04842 715/779 |
| 6,587,787 | B1* | 7/2003 | Yokota ................... G01C 21/36 701/455 |
| 6,983,203 | B1 | 1/2006 | Wako |
| 7,013,110 | B1 | 3/2006 | Carpenter et al. |
| 7,661,074 | B2* | 2/2010 | Sadler ................. G06F 3/04895 345/168 |
| 7,814,435 | B2 | 10/2010 | Wako |
| RE42,414 | E * | 5/2011 | Fukushima ............... G09G 5/42 345/629 |
| 7,991,545 | B2 | 8/2011 | De Silva et al. |
| 8,566,029 | B1* | 10/2013 | Lopatenko ........... G08G 1/0962 701/400 |
| 8,694,791 | B1* | 4/2014 | Rohrweck ............... G06F 21/36 455/418 |
| 2005/0182559 | A1 | 8/2005 | Listle et al. |
| 2005/0251334 | A1* | 11/2005 | Mizuno .............. G01C 21/3682 701/533 |
| 2007/0198181 | A1* | 8/2007 | Shimamura .......... G09B 29/106 701/423 |
| 2008/0294330 | A1* | 11/2008 | Sasano ............... G01C 21/3415 701/117 |
| 2009/0055774 | A1 | 2/2009 | Joachim |
| 2009/0088964 | A1* | 4/2009 | Schaaf ................. G01C 21/367 701/532 |
| 2009/0110302 | A1* | 4/2009 | Snow ...................... G06T 17/05 382/225 |
| 2009/0140889 | A1* | 6/2009 | Mohaupt .............. G08G 1/0969 340/995.13 |

(Continued)

FOREIGN PATENT DOCUMENTS

EP   0829704   3/1998
EP   1102037   5/2001

(Continued)

OTHER PUBLICATIONS

Search Report issued by European Patent Office for the counterpart European application.

Primary Examiner — Ryan Pitaro
(74) Attorney, Agent, or Firm — Muramatsu & Associates

(57) ABSTRACT

A method and an apparatus of displaying a plurality of items on a map includes operations of selecting the plurality of items, associating the plurality of items with a plurality of graphic attributes respectively in a manner that two items of the plurality of items are associated with different graphic attributes, and displaying the plurality of items using the plurality of graphic attributes. Thus, the method of displaying the plurality of items on the map allows a user to distinguish the plurality of items by graphic attributes while at least one of the plurality of items is specified by user's voice commands, even if the plurality of items belong to a same group attribute.

18 Claims, 17 Drawing Sheets

(56) References Cited

U.S. PATENT DOCUMENTS

| | | | | |
|---|---|---|---|---|
| 2009/0144660 A1* | 6/2009 | Wako | G01C 21/3682 | 715/835 |
| 2009/0177373 A1* | 7/2009 | Groenhuijzen | G01C 21/36 | 701/117 |
| 2011/0047509 A1* | 2/2011 | Arrasvuori | G01C 21/3673 | 715/815 |
| 2011/0055739 A1* | 3/2011 | MacFarlane | G01C 21/3664 | 715/764 |
| 2011/0216179 A1 | 9/2011 | Dialameh et al. | | |
| 2011/0276565 A1* | 11/2011 | Zheng | G01C 21/20 | 707/724 |
| 2012/0089329 A1 | 4/2012 | Kim et al. | | |
| 2013/0169664 A1* | 7/2013 | Strassenburg-Kleciak | G01C 21/3682 | 345/589 |
| 2014/0253582 A1* | 9/2014 | Chen | G09G 5/30 | 345/594 |
| 2015/0161252 A1* | 6/2015 | Lennan | G06F 17/30825 | 707/722 |

FOREIGN PATENT DOCUMENTS

| | | |
|---|---|---|
| EP | 2390628 | 11/2011 |
| JP | 2004-69424 | 3/2004 |

\* cited by examiner

METHOD OF DISPLAYING OBJECTS ON NAVIGATION MAP

BACKGROUND

1. Field

The present disclosure relates to a method of displaying objects on navigation map for voice commands. More specifically, embodiments in the present disclosure relate to a method of displaying objects on navigation map, which enable the objects to be distinguished in voice commands.

2. Description of the Related Art

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the current position, and reads out map data pertaining to an area at the current position either from a local data storage medium such as a digital versatile disc (DVD), a hard disk drive (HDD) or a solid-state drive (SSD), or from a remote server via internet. Typically, the navigation system displays a map image on a monitor screen while superimposing thereon graphical marks representing a current location of the user and a destination. In addition, as other geographical information, such as Point of Interests (POIs) by category, or traffic information signs indicating traffic conditions such as traffic incidents, traffic congestions, road or lane closures, detours, criminal situations, natural disasters, may be superimposed on the map image on the monitor.

A situation may arise where a user who wants to search multiple POIs of the same type, which may cause multiple POI icons of the same type associated with the multiple POIs to be displayed on the same map simultaneously. Alternatively, another situation may arise where a certain traffic condition occurs at multiple locations and more than one traffic condition icons of the same traffic condition will be displayed on the map simultaneously. While the user is selecting one location represented by one icon from these icons by a touch operation, while driving load is relatively low and such a touch operation is allowed, this does not cause a problem.

While driving load is relatively high and touch operation becomes a driving distraction, a touch operation may need to be prohibited, and another input method, such as voice command for example, may be appropriate. There is, however, a problem. When using voice commands, it may be inconvenient and/or impossible for a driver to select a dynamic object, such as a POI icon or a traffic information sign, among a plurality of the same kind icons on the navigation map, if these icons or signs are graphically displayed in the similar manner.

Japanese patent publication by Ishida et al. (JP 2004-69424) discloses a navigation apparatus that enables a user to clearly grasp a target that is concerned with map information and can be inputted by voice in an easy manner. More particularly, this publication describes an identification information giving section that provides identification information to each of a plurality of voice input targets that are concerned with the map information and can be inputted by voice, and a display control unit that relates the voice input targets to the identification information for displaying at the display unit, where the identification information giving section provides identification information with consecutive numbers.

U.S. Pat. No. 7,013,110 by Carpenter et al. discloses a graphic (with text) display screen of a radio receiver apparatus used at a sporting event to provide a spectator with additional information. Here, the display includes a text identification of a car number, a driver and the position in time of that driver behind the leader. This display further includes a graphic illustration of a race track on which there are shown symbols representing the race cars. The symbols can be differentiated by color, texture, shape or by on/off flashing of the particular symbol so that it is apparent to the spectators which car is the selected car.

U.S. Patent Application Publication No. 2011/0216179 by Dialameh et al. discloses an augmented reality panorama which is capable of supporting visually impaired individuals, in which meta-tags to objects (e.g., locations, color, shape, etc.) are assigned, and triggered by input from a sighted assistant. Once the information is sent to a visually impaired person, the person can use audio or haptic feedback (i.e. device commands) to address the object with the meta-tag.

Accordingly, there is a need of a way of identifying particular one of the same category POIs or traffic information signs represented in the similar manner. Therefore, there remains a need for a new and improved method of displaying a plurality of items on a map of a vehicle navigation system which allows a user to distinguish the plurality of items by graphic attributes while at least one of the items is described in voice commands, even though the items belong to one same group attribute, such as the same category POIs or traffic signs.

SUMMARY

In one aspect, a method of displaying a plurality of items on a map is provided. This method includes steps of selecting the plurality of items, associating the plurality of items with a plurality of graphic attributes respectively in a manner that every two items of the plurality of items are associated with different graphic attributes, and displaying the plurality of items using the plurality of graphic attributes.

In one embodiment, the plurality of graphic attributes are related to shapes. The shapes may include at least one of a circle, a double circle, a triangle, a rectangle, a star shape, a heart shape, a diamond shape, a club shape, and a spade shape. Alternatively, the shapes may be different decorative frames. The decorative frames comprise at least one of a ring of flowers, a ring of stars, candy rings, a heart ring, and a dashed frame.

In one embodiment, the plurality of graphic attributes are related to colors. The colors may include at least one of red, pink, orange, yellow, green, blue, dark blue, purple, and brown.

In one embodiment, the plurality of graphic attributes are related to patterns. The patterns may include at least one of shading, dotting, hatching, and striping.

In one embodiment, the plurality of graphic attributes are related to symbols. In another embodiment, the plurality of graphic attributes are related to characters.

In one embodiment, the plurality of graphic attributes are related to a combination of at least two of shape, color and patterns, symbols and characters. Any two items on the map have different graphic attributes of at least shape, color pattern, symbol and character.

In one embodiment, the selected plurality of items are of one group attribute. In one aspect, the group attribute may be a category of Point of Interest (POI). In another aspect, the group attribute is related to one of traffic conditions. The traffic conditions may include at least one of traffic incidents, traffic accidents, traffic congestions, road or lane closures, detours, criminal situations, natural disasters, constructions, animal crossing, vehicle crossing, etc.

In one embodiment, the method of displaying the plurality of items on the map further includes steps of receiving a voice command associated with one of the plurality of graphic attributes with a microphone, recognizing one of the plurality of graphic attributes associated with the voice command, and selecting an item from the plurality of the items based on the recognized one graphic attribute.

In one embodiment, the method of displaying the plurality of items on the map further includes steps of displaying buttons associated with the plurality of graphic attributes on a controller at a proximity of a hand of a user, receiving a button entry associated with one of the plurality of graphic attributes, recognizing one of the plurality of graphic attributes associated with the button entry, and selecting an item from the plurality of the items based on the recognized one graphic attribute. The controller may be a touch screen.

The above and other aspects, objects and advantages may best be understood from the following detailed discussion of the embodiments.

DETAILED DESCRIPTION OF THE PREFERRED EMBODIMENTS

Various embodiments for the method of displaying a plurality of items on a map of a navigation system will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method of displaying a plurality of items on a map of a navigation system installed on a vehicle, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to a method of displaying a plurality of items on a map of a navigation system. Furthermore, the embodiments are related to a method of receiving a voice command associated with one of the plurality of items on the map with a microphone, recognizing the voice command and selecting the one of the plurality of items associated with the voice command. Thus, a user can easily and selectively instruct an item among the plurality of items on the map.

Figure 1:
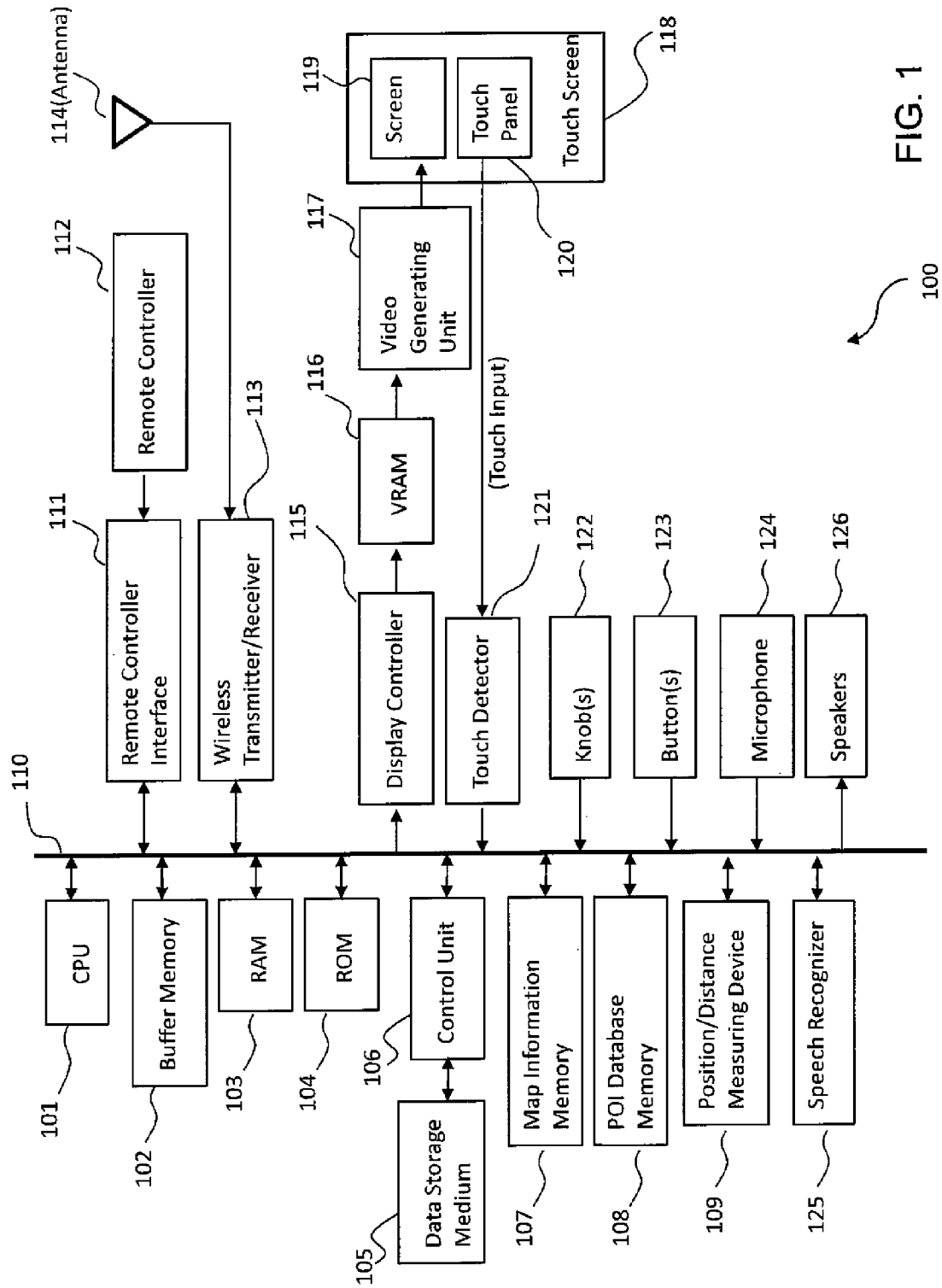
FIG. 1 is a block diagram of a navigation system according to one embodiment.

FIG. 1 is a block diagram of a vehicle navigation system that executes a method of displaying a plurality of items on a map according to one embodiment. Note that the block diagram in FIG. 1 is merely an example according to one embodiment for an illustration purpose and not intended to represent any one particular architectural arrangement. The various embodiments can be applied to other type of navigation system implemented by portable navigation systems, personal digital assistants, cellular phones, smart phones, portable computers, sets of client computers and server computers in a network. For example, the vehicle navigation system 100 includes a central processor unit (CPU) 101 for controlling an overall operation of the navigation system, a buffer memory 102 for temporally storing data such as an icon data table for efficient displaying icons in accordance with this disclosure, a random access memory (RAM) 103 for storing a processing result such as guide route, and a read only memory (ROM) 104 for storing various control programs, such as a route search program and a map matching program necessary for navigation control as well as icon displaying program of this disclosure.

The vehicle navigation system 100 also includes a data storage medium 105 such as a hard disk in a hard disk drive (HDD), a flash memory in a solid state drive (SSD) or USB key memory, a compact disc-read only memory (CD-ROM), a digital versatile disc (DVD) or other storage medium for storing the map data. The vehicle navigation system 100 also includes a control unit 106 for controlling an operation for reading the information from the data storage medium 105. The vehicle navigation system 100 also includes a position/distance measuring device 109 for measuring a present vehicle position or user position. For example, the position measuring device 109 has a vehicle speed sensor for detecting a moving distance, a gyroscope for detecting a moving direction, a microprocessor for calculating a position, a global positioning system (GPS) for receiving and analyzing GPS signals, etc. and each connected by a bus system 110.

The vehicle navigation system 100 further includes a map information memory 107 for storing a portion of the map data relevant to ongoing operations of the vehicle navigation system 100 which is read from the data storage medium 105, a point of interest (POI) database memory 108 for storing database information such as POI information which is read out from the data storage medium 105.

The vehicle navigation system 100 accommodates a plurality of means for receiving user inputs. For example, the navigation system 100 may include a remote controller 112 externally for executing menu selection operations, cursor movements, zoom in/out operations, destination entry operations etc., and a remote controller interface 111, in the navigation system 100 and coupled to other devices via a bus system 110, handles reception of signals from the remote controller 112. Although a remote controller is one example for selecting menus, executing selected functions etc., the navigation system includes various other input methods, to achieve the same and similar operations done through the remote controller. For example, the navigation system 100 may include a touch detector 121 for detecting a touch or press input of a user on a touch panel 120 of a touch screen 118, which allows the user to enter intuitive look and feel input. Alternatively, as seen in a traditional vehicle entertainment system, knobs 122 and buttons 123 may be included in the navigation system 100. To accommodate hands-free input operation to avoid driver distraction, it may be appropriate to use voice commands as user inputs for the navigation system 100. To accommodate such voice commands, microphone 124 for receiving speech input may be included. Once a voice command is received at the microphone 124, the voice command is sent to a speech recognizer 125 to be matched with any speech pattern associated with navigation related vocabulary in a speech database and the matched speech pattern is interpreted as a voice command input from the user.

The vehicle navigation system 100 may also include a plurality of means to output an interactive result of user input operations. For example, the navigation system 100 may include a display controller 115 for generating map images, such as map guide images, arrow guide images, icon images of POIs, as well as menu related images related to the map information and the generated map image is stored in a video RAM (VRAM) 116. The map image stored in the VRAM 116 is sent to a video generating unit 117 where the map image is converted to an appropriate format to be displayed on a screen 119 of a touch screen 118. Upon the receipt of video data, the screen 119 displays the map. Alternatively, to keep eyes of a driving user on a road rather than prompting the driving user to look in to the screen, the interactive output may be presented to the driving user as audio feedback via one or more speakers 126.

Furthermore, the navigation system 100 may include a wireless transmitter/receiver 113. Using the wireless transmitter/receiver 113 via antenna 114, the navigation system 100 may communicate with external devices inside the vehicle, external devices surrounding vehicles, remote servers and networks, etc. For example, the wireless transmitter/receiver 113 may be used for retrieving map and traffic information from a remote server that updates map and traffic data frequently and periodically.

The bus system 110 may include one or more busses connected to each other through various adapters, controllers, connectors, etc. and the devices and units mentioned the above were coupled to each other via the bus system.

The CPU 101 controls an overall operation of the navigation system including displaying operation of icons on a screen according to one embodiment, such as associating the plurality of items with a plurality of graphic attributes respectively in a manner that every two items of the plurality of items are associated with different graphic attributes. For example, the data related to the plurality of items, and the plurality of graphic attributes of icons will be stored in the buffer memory 102 for further processing. As noted above, the navigation system 100 conducts the process of associating the plurality of items with a plurality of graphic attributes respectively in a manner that every two items of the plurality of items are associated with different graphic attributes.

Figures 2A, 2B:
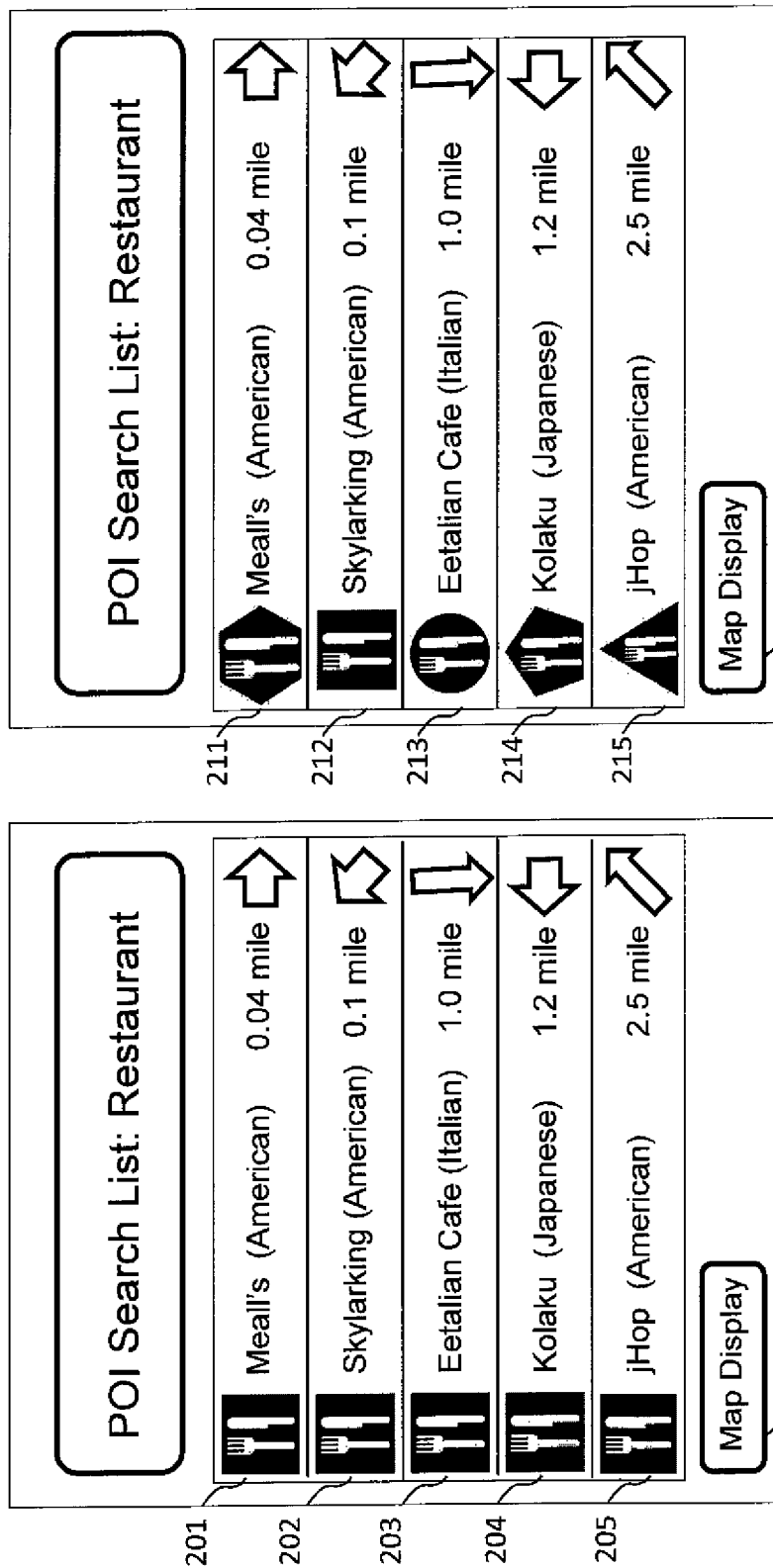
FIGS. 2A and 2B show displayed screen examples of a POI search result as a POI Search List.

In one embodiment, when a user executes search of restaurants as POIs on the car navigation system 100, an example of a search result of POIs in a list structure on a touch screen 118 having icons representing the POIs at certain locations is shown by directions and distances from a current vehicle location. If the icons representing the POIs are identical as shown in FIG. 2A, because a group attribute of the POIs, such as a category of the POIs, is the same, a list of restaurants is shown on the screen 118 as a list of search result POIs. In this case, icons 201, 202, 203, 204 and 205 are identical, representing restaurants where the POIs are the restaurants. Thus, it is very difficult for a user to select one restaurant among the plurality of restaurants on the map with a voice command. In contrast, FIG. 2B shows an example of a search result of POIs in a list structure on the touch screen 118, based on one embodiment, having icons representing the POIs are different, even if a group attribute of the POIs, such as a category of the POIs, is the same. For example, when a user executes search of restaurants as POIs on the car navigation system 100, a list of restaurants is shown on the touch screen 118 as a list of search result POIs. In this case, icons 211, 212, 213, 214 and 215 are different in shape, even though the icons represent restaurants where the POIs are the restaurants.

In one embodiment, a touch screen region 216 as shown in FIG. 2B may be presented to the user, allowing the user to display POI restaurants on a map. If the user activates the region 216, either by pressing the region 216, uttering a voice command "map display", or focusing on the region 216 with a remote controller, the result of POI search will be displayed on a map. Alternatively, it is possible to have another embodiment where the search result is displayed on a map as default, or the selection of whether the search result is displayed in a map or list can be selected while instructing the search.

Figure 2C:
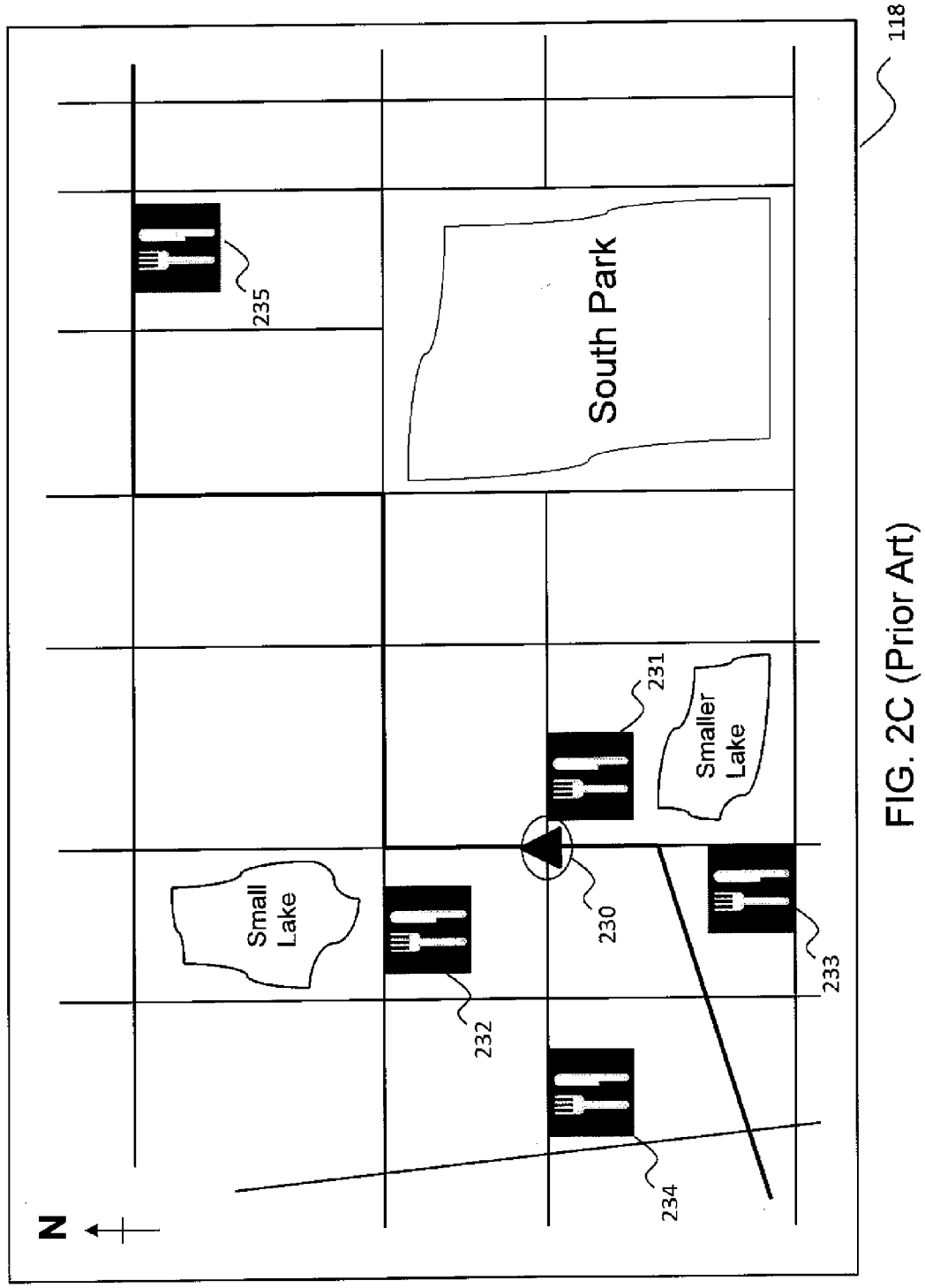
FIG. 2C shows a displayed screen example of a map including the POI search result of FIG. 2A as icons.
Figure 2D:
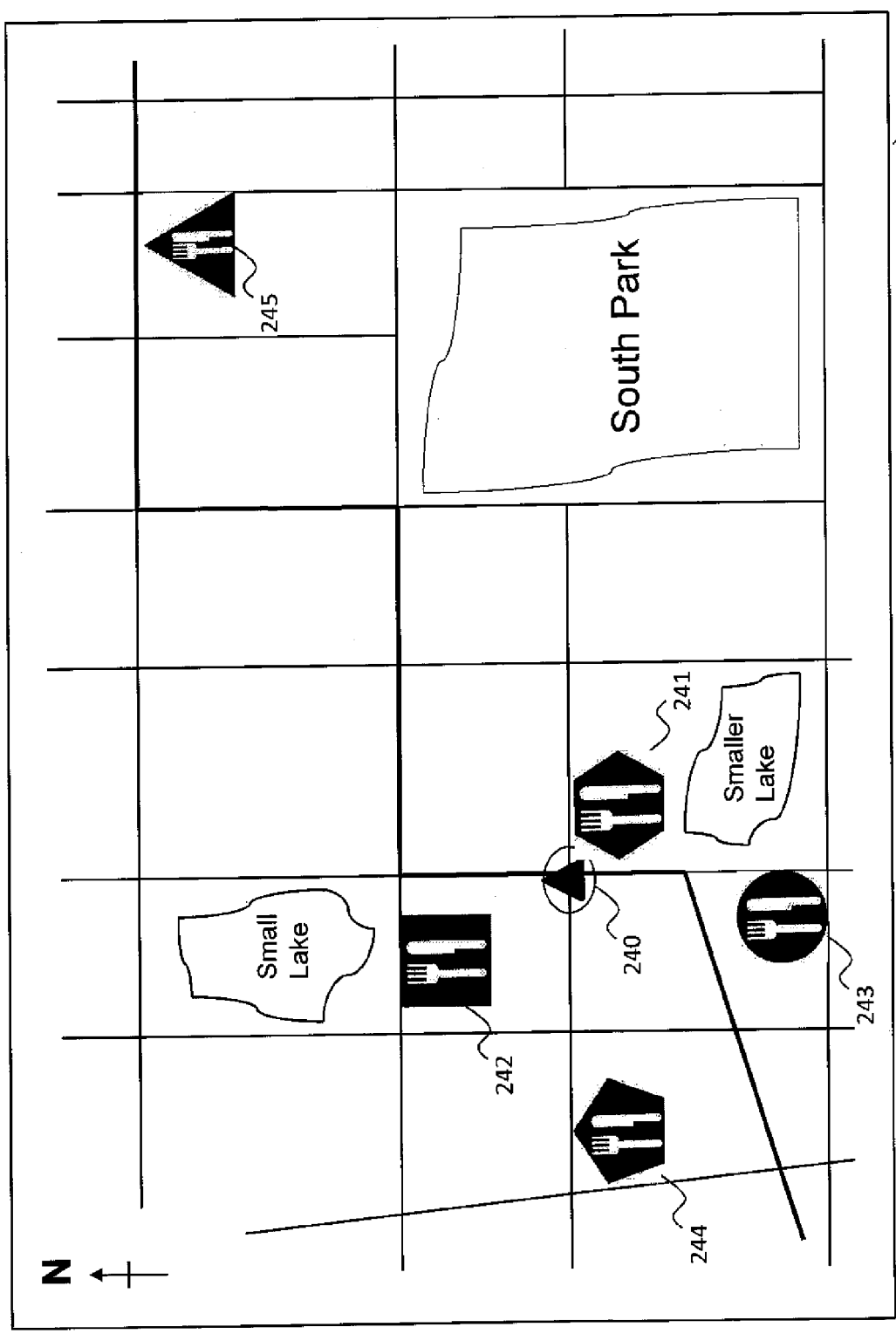
FIG. 2D shows a displayed screen example of a map including the POI search result of FIG. 2B as icons.
Figure 2E:
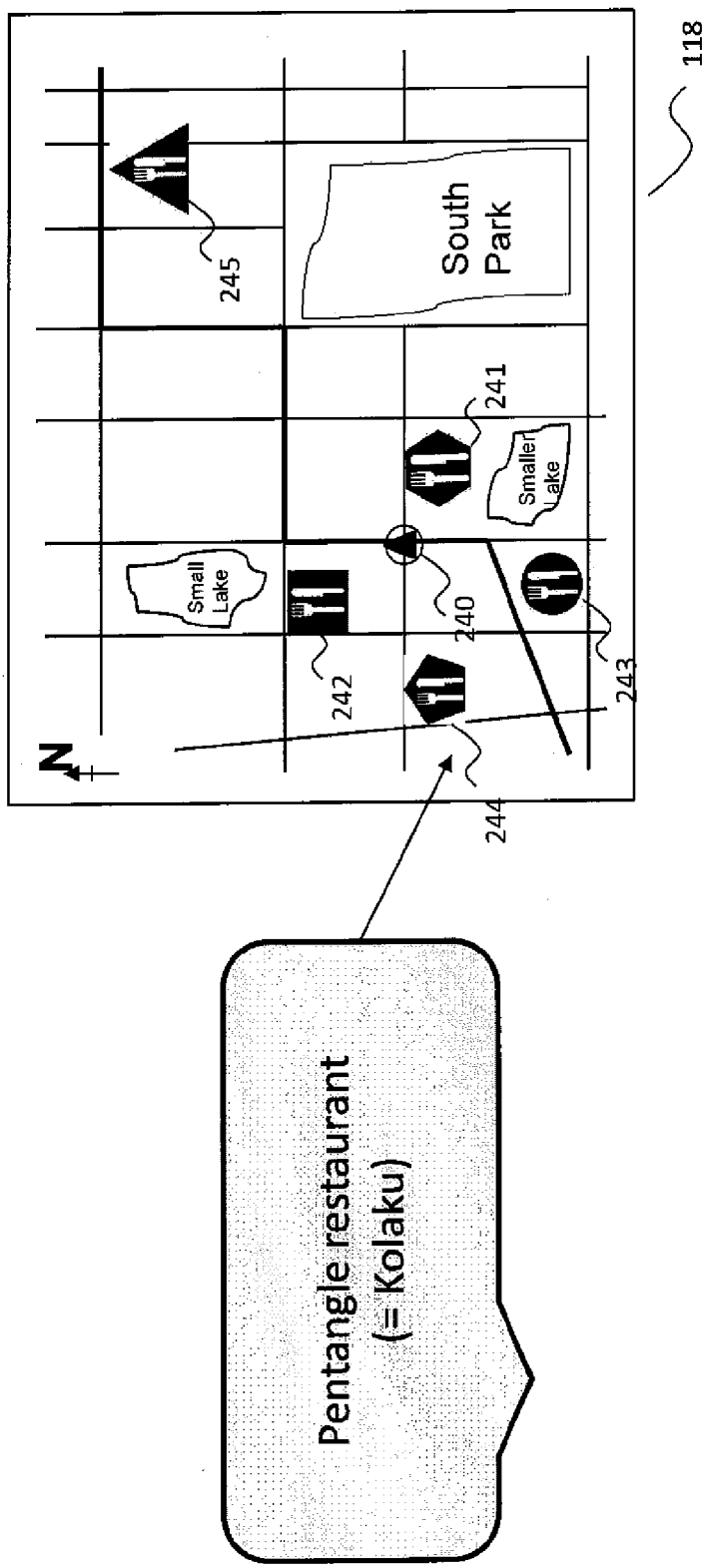
FIG. 2E illustrates an example user command related to a POI to be selected on the map of FIG. 2D.

FIG. 2C shows an example of displaying a search result of POIs in a map on the touch screen 118 having identical icons representing the POIs, if a group attribute of the POIs, such as a category of the POIs, is the same. For example, if a user executes search of restaurants as POIs on the car navigation system 100 or executes a command "map display" by activating the region 206 in the touch screen 118 as shown in FIG. 2A, a map including an icon indicating a current vehicle position 230 and icons indicating restaurants are shown on the touch screen 118 as a search results of POIs. In this case, icons 231, 232, 233, 234 and 235 are identical, representing restaurants where the POIs are the restaurants. Thus, it is very difficult for a user to select one restaurant among the plurality of restaurants indicated in the map with a voice command. In contrast, FIG. 2D shows an example of a search result of POIs in another map on the touch screen 118, based on one embodiment, having different icons representing the POIs, even if a group attribute of the POIs, such as a category of the POIs, is the same. For example, if a user executes search of restaurants as POIs on the car navigation system 100 or executes a command "map display" by activating the region 216 in the touch screen 118 as shown in FIG. 2B, a map including an icon indicating a current vehicle position 240 and icons 241, 242, 243, 244 and 245 representing restaurants are shown on the touch screen 118 as a search result of POIs. In this case, icons 241, 242, 243, 244 and 245 are different in shape, even though the icons represent restaurants where the POIs are the restaurants. restaurant indicated by the icon 244 in a pentagonal shape among a plurality of restaurants indicated by the icons of different shapes in the map. Thus, it is easy for a user to select one restaurant with a voice command.

Figures 3A, 3B:
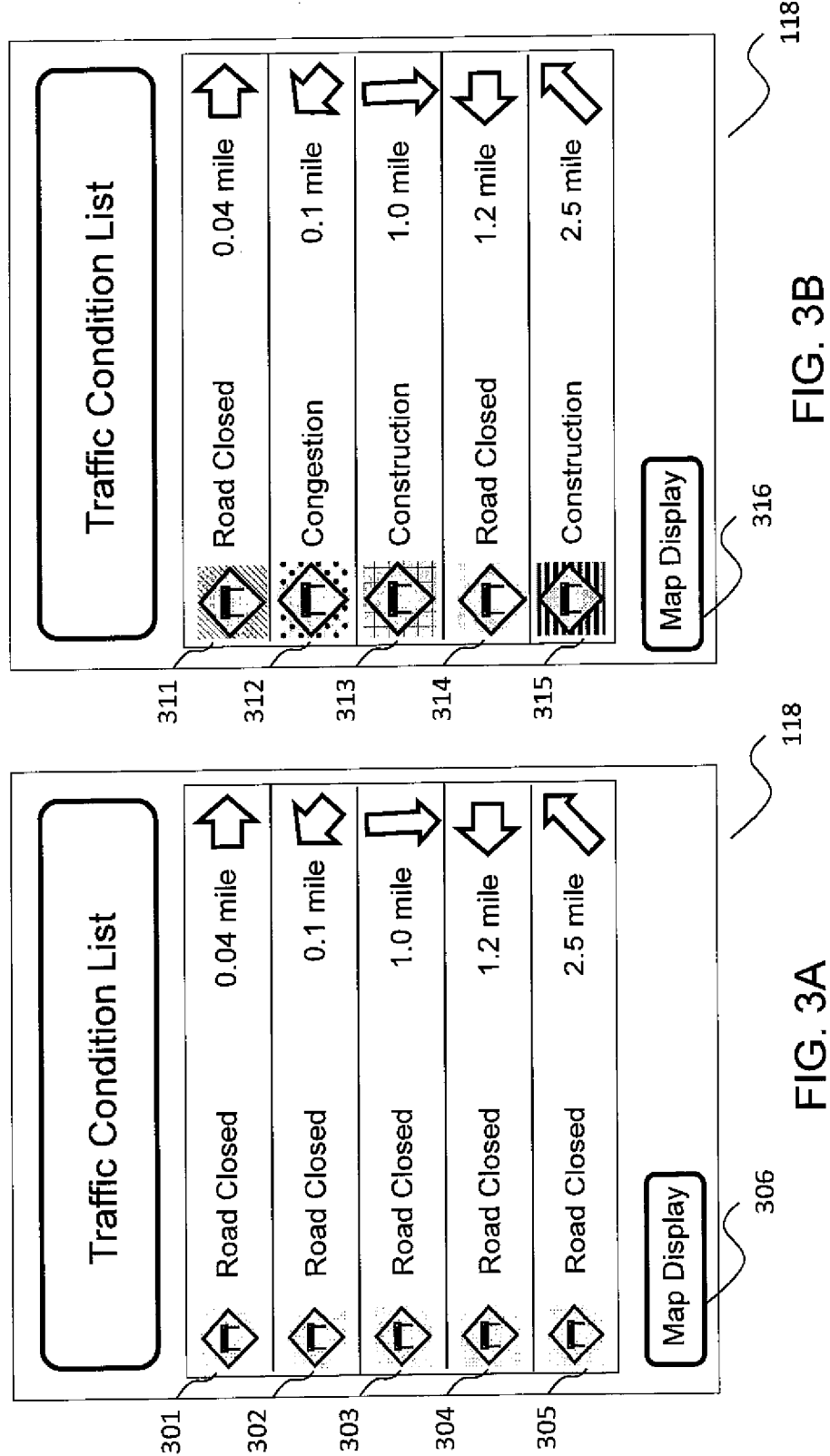
FIGS. 3A and 3B show displayed screen examples of traffic conditions as a Traffic Conditions List.

In another embodiment, when a user executes search of traffic conditions on the car navigation system 100, an example of a search result of traffic conditions in a list structure on a touch screen 118 having icons representing the traffic conditions at certain locations is shown by directions and distances from a current vehicle location. If the graphic attributes of icons representing the traffic conditions are identical as shown in FIG. 3A, because a group attribute of the traffic conditions, such as a category of the traffic conditions, is the same, a list of traffic conditions is shown on the screen 118 as a list of search result of traffic conditions. In this case, a background graphic attribute, such as background pattern of icons 301, 302, 303, 304 and 305 are identical, representing traffic conditions. Because it is difficult to utter a traffic condition phrase itself, it is very difficult for a user to select one traffic condition item with a voice command. In contrast, FIG. 3B shows an example of a search result of traffic conditions in a list structure on the touch screen 118, based on one embodiment, having different icons representing the traffic conditions in a decorative graphic attribute, such as filling pattern, even if a group attribute of the traffic conditions, such as a category of the traffic conditions, is the same. For example, when a user executes search of traffic conditions on the car navigation system 100, a list of traffic conditions is shown on the touch screen 118 as a list of search result of traffic conditions. In this case, icons 311, 312, 313, 314 and 315 are different in background pattern, even though the icons represent traffic conditions where the locations are associated with the traffic conditions. In this example, it is noticeable that icons 311, 312, 313, 314 and 315 having the same kind of traffic conditions ("Road Closed") can be distinguishably displayed with shaded background pattern, dotted background pattern, hatched/meshed background pattern, white background pattern, and stripe background pattern, respectively on the map.

In one embodiment, a touch screen region 316 as shown in FIG. 3B may be presented to the user, allowing the user to display traffic conditions on a map. If the user activates the region 316, either by pressing the region 316, uttering a voice command "map display", or focusing on the region 316 with a remote controller, the result of searched traffic conditions will be displayed on a map. Alternatively, it is possible to have another embodiment where the search result is displayed on a map as default, or the selection of whether the search result is displayed in a map or list can be selected while instructing the search.

Figure 3C:
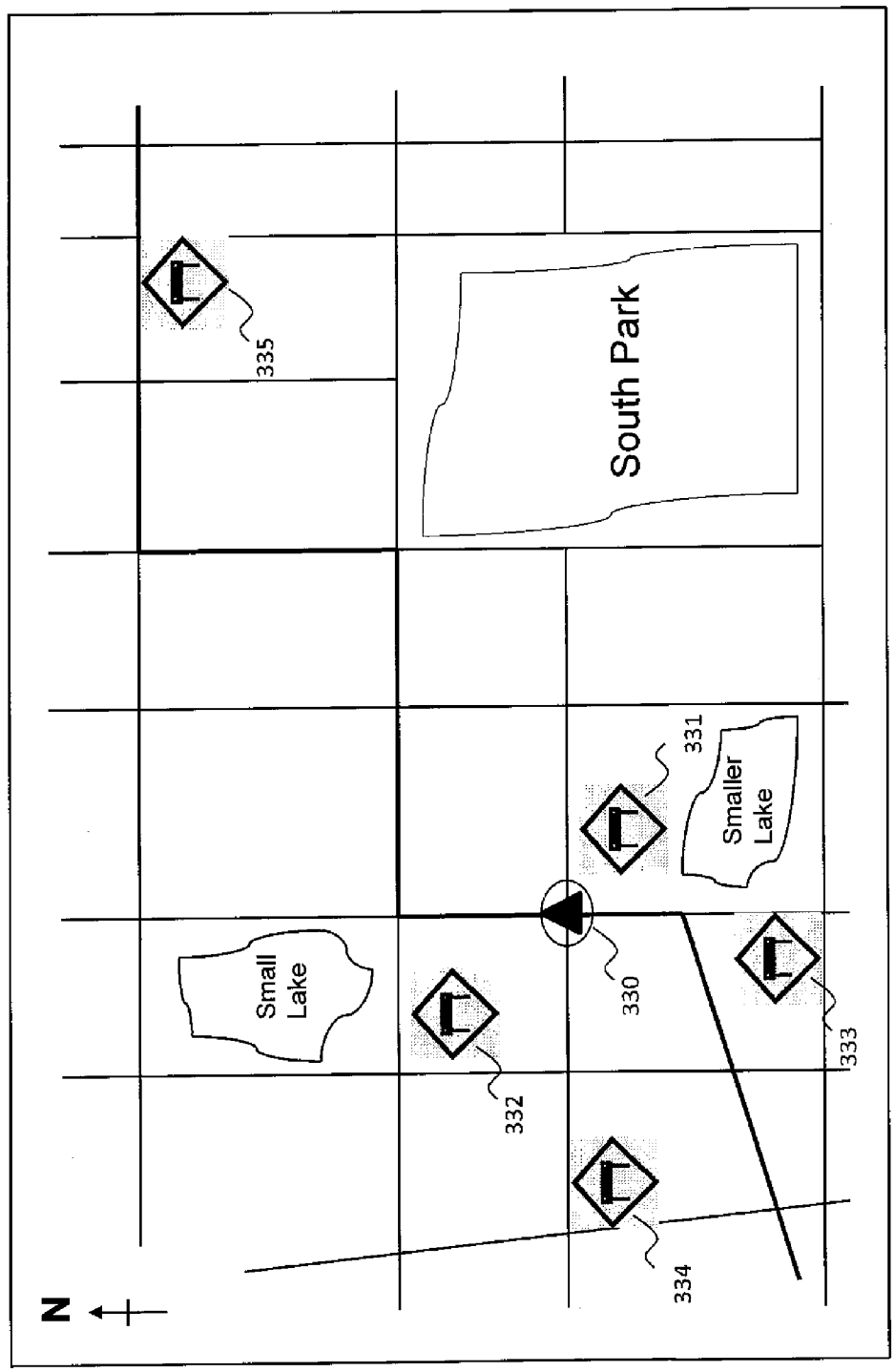
FIG. 3C shows a displayed screen example of a map including the traffic conditions of FIG. 3A as icons.
Figure 3D:
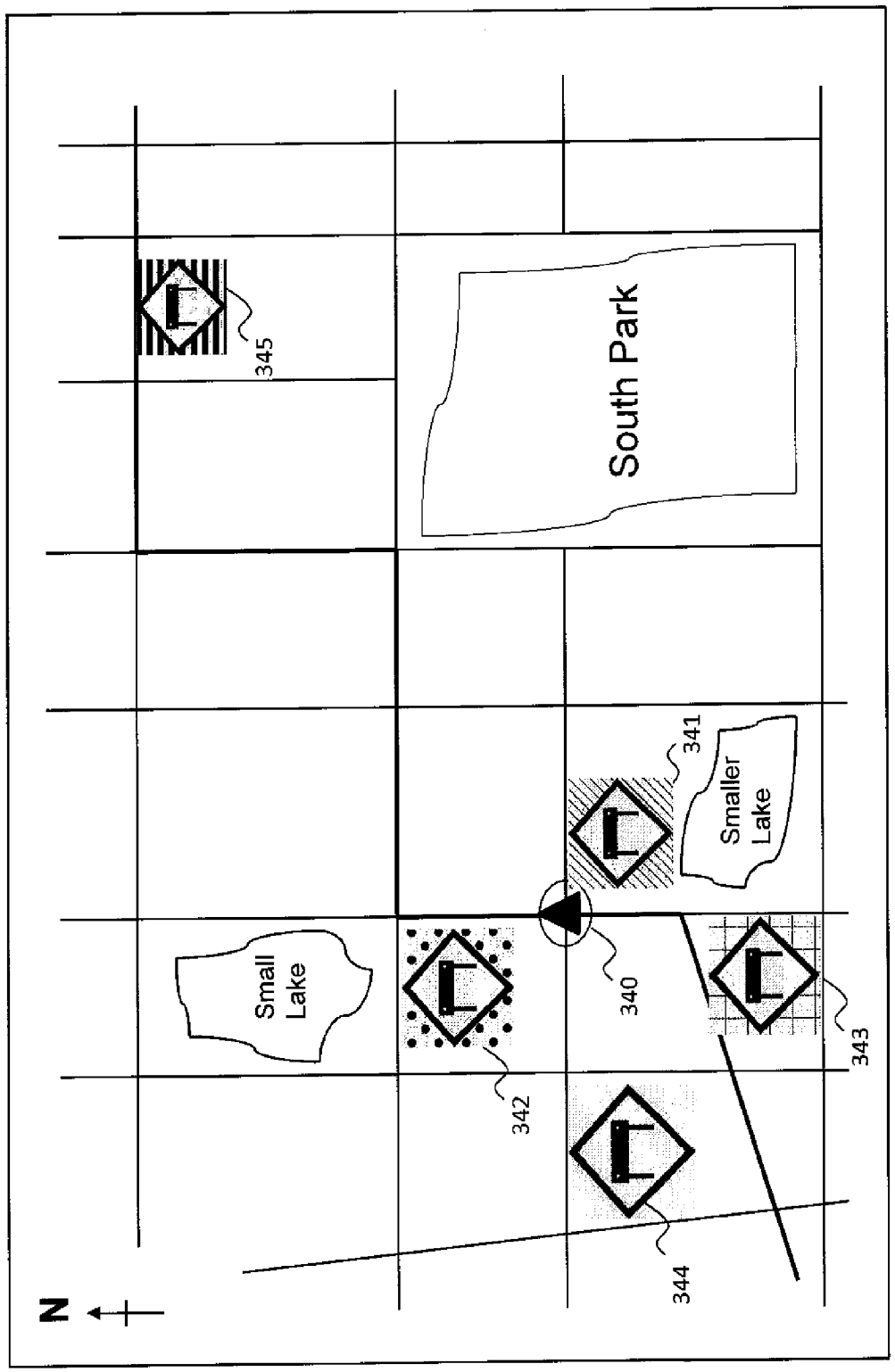
FIG. 3D shows a displayed screen example of a map including the traffic conditions of FIG. 3B as icons.
Figure 3E:
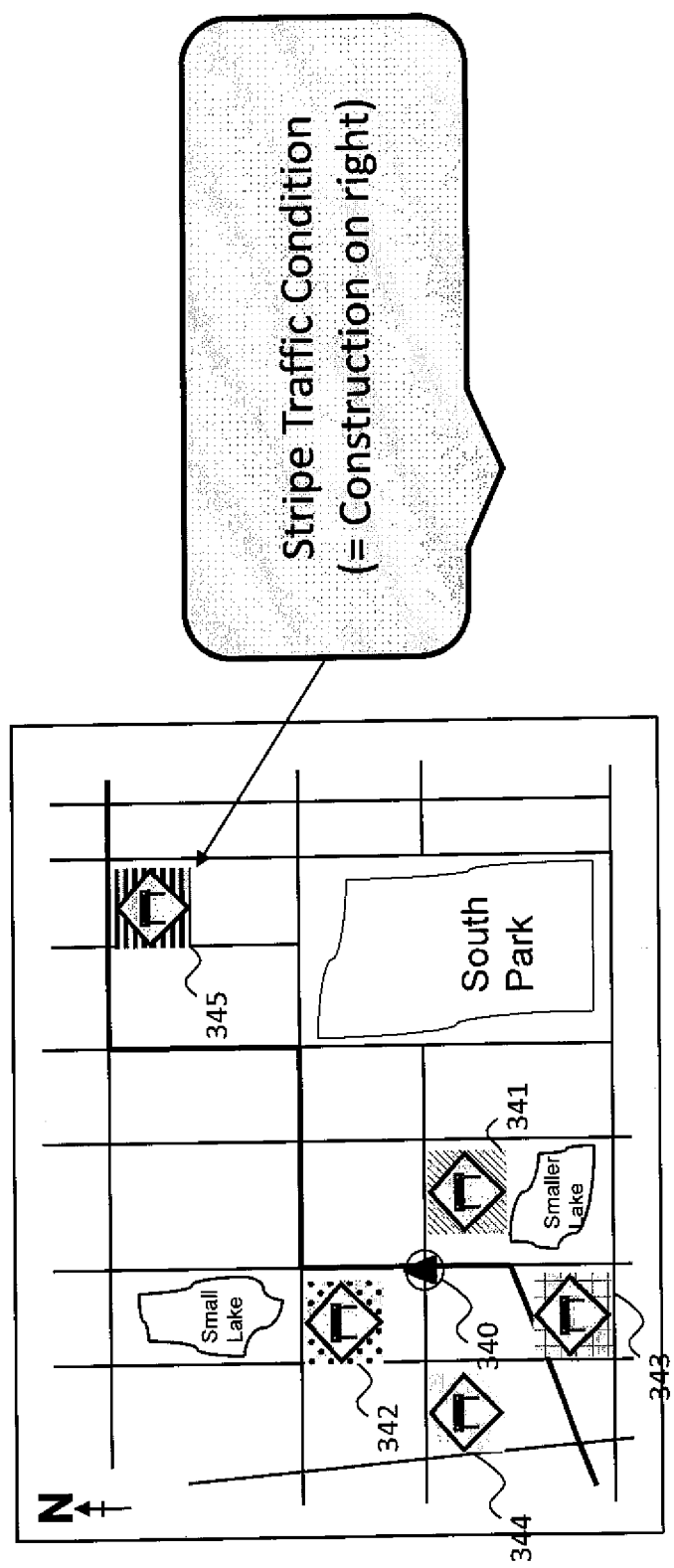
FIG. 3E illustrates an example user command related to a traffic condition to be selected on the map of FIG. 3D.

FIG. 3C shows an example of displaying a search result of traffic conditions in a map on the touch screen 118 having graphic attributes of icons, such as background gray pattern representing the traffic conditions, which are identical, if a group attribute of the traffic conditions, such as a category of the traffic conditions, is the same. For example, if a user executes search of traffic conditions on the car navigation system 100 or executes a command "map display" by activating the region 306 in the touch screen 118 as shown in FIG. 3A, a map including an icon indicating a current vehicle position 330 and icons indicating traffic conditions are shown on the touch screen 118 as a search result of traffic conditions. In this case, icons 331, 332, 333, 334 and 335 are identical, representing certain locations of traffic conditions. Because it is difficult for a driving user to utter an entire traffic condition phrase itself, it is very difficult for the driving user to select one location of a certain traffic condition with a voice command. In contrast, FIG. 3D shows an example of a search result of traffic conditions in another map on the touch screen 118, based on one embodiment, having different icons representing the traffic conditions, even if the icons belong to a group attribute of traffic conditions, which is the same. For example, if a user executes search of traffic conditions on the car navigation system 100 or executes a command "map display" by activating the region 316 in the touch screen 118 as shown in FIG. 3B, a map including an icon indicating a current vehicle position 340 and icons 341, 342, 343, 344 and 345 indicating locations of the traffic conditions are shown on the touch screen 118 as a search result of traffic conditions. In this case, icons 341, 342, 343, 344 and 345 are different in background pattern, even though the icons represent traffic conditions. In this example, it is noticeable that icons 341, 342, 343, 344 and 345 having the same kind of traffic conditions ("Road Closed") can be distinguishably displayed with shaded background pattern, dotted background pattern, hatched/meshed background pattern, white background pattern, and stripe background pattern, respectively, on the map. FIG. 3E indicates a sample voice command to select a location of traffic condition indicated by the icon 345 with a stripe background among a plurality of locations of traffic conditions indicated by icons in different background pattern in the map. Thus, it is easy for a user to select one location of a certain traffic condition with a voice command.

Figure 4A:
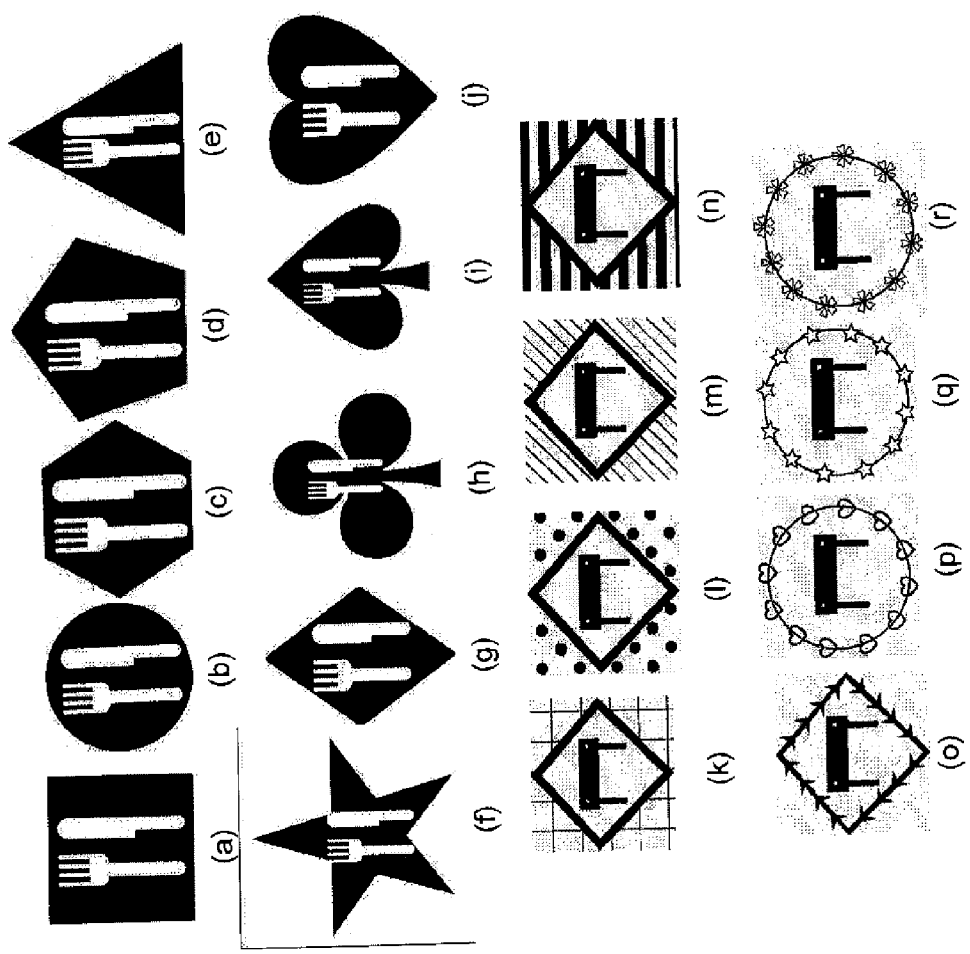
FIGS. 4A and 4B show schematic diagrams illustrating various graphical differentiation schemes based on various embodiments.
Figure 4B:
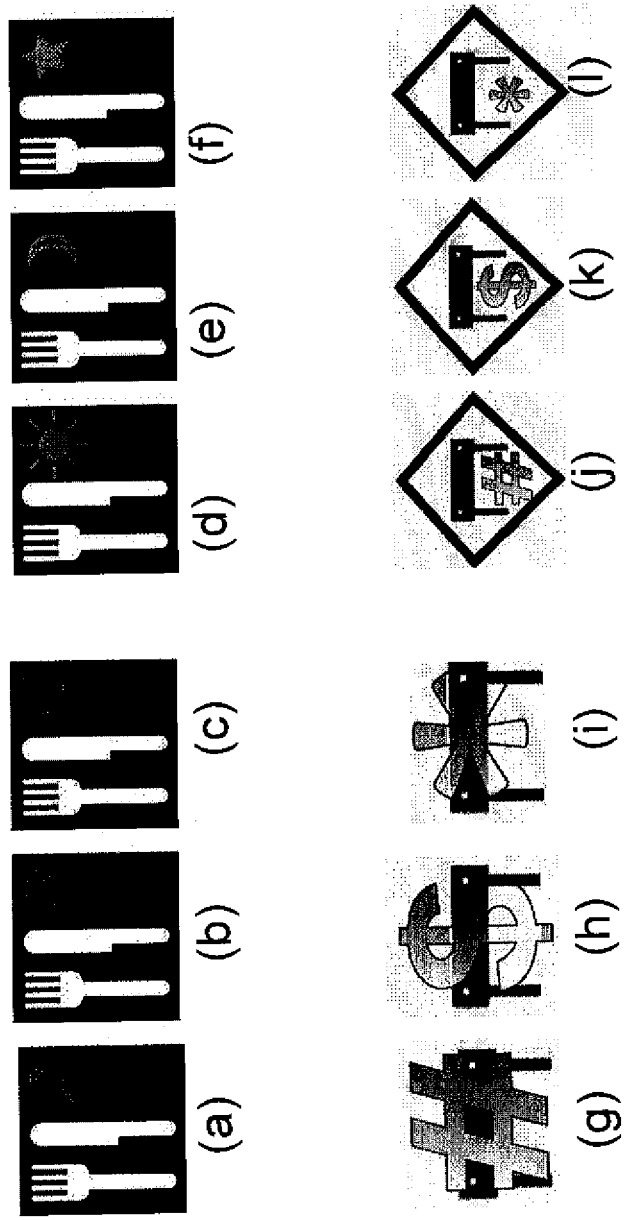

In the above, the embodiment using icons with different shapes and the embodiment using icons with different background patterns are described. In one embodiment, icons may be in geometric figures, such as a circle, polygon figures including a triangle, a rectangle, a pentagon, a hexagon, a star and so on, as shown in FIG. 4A (*a*)-(*f*). In one embodiment, icons may be in suit figures of tramps, such as a heart shape, a diamond shape, a club shape, and a spade shape, as shown in FIG. 4A (*g*)-(*j*). In another embodiment, icons may have different patterns, either in foreground or background. For example, icons may have different patterns in their backgrounds, as shown in FIG. 4A (*k*)-(*n*). However, embodiments are not limited to the above described examples. For example, there may be another embodiment that uses icons with different decorative frames, as shown in FIG. 4A, (*o*)-(*r*). There may be another embodiment that uses icons with different colors (not shown). It is possible to have one embodiment which uses icons with different characters. For example, FIG. 4B (*a*)-(*c*) may represent icons with different characters. In this embodiment, it is important to have different characters to distinguish between icons, which allows a user to distinctively specify one icon, rather than providing any meanings or orders. In another embodiment, icons may have different symbols, as shown in FIG. 4B, (*d*)-(*f*). Again, the symbols do not have to be associated with any meanings, but rather, the symbols are merely providing appearances to distinguish between icons to the user. Graphical alignment of graphic attributes with icons may vary. For example, symbols do not have to be embedded in the background, and may be overlaid on icon figures, as shown in FIG. 4B, (*g*)-(*i*). Alternatively the symbols may be just placed at the proximity of icon figures, as shown in FIG. 4B, (j)-(l). Alternatively, it is possible to have another embodiment which uses a combination of the above graphic attributes. However, the embodiments of different graphic attributes are not limited to the examples in FIGS. 4A and 4B.

Figure 5:
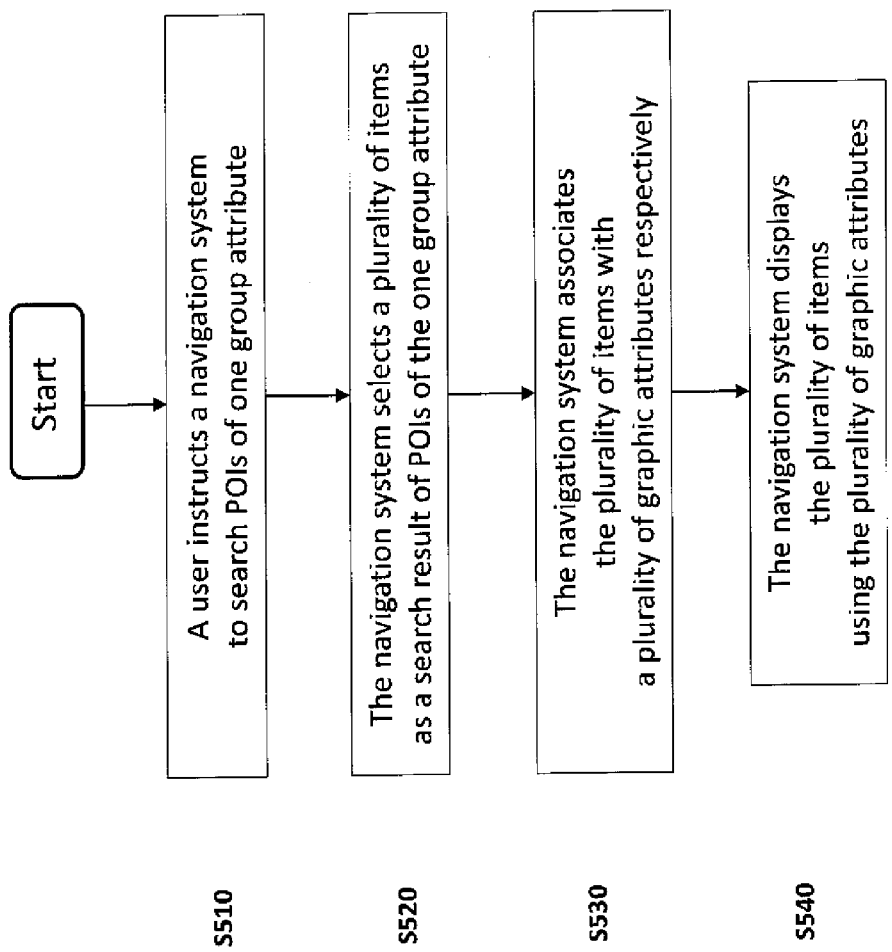
FIG. 5 is a flow chart of searching POIs and displaying POIs in one embodiment.

FIG. 5 is a flow chart of a procedure of the method of displaying a plurality of items on a map according to one embodiment. In step S510, a user enters an input on a navigation system, instructing the navigation system to search POIs of one group attribute. For example, the one group attribute may be a category of POIs, such as restaurants, hotels, gas stations, etc. In step S520, the navigation system selects a plurality of items as a search result of POIs of the one group attribute, based on the entered one group attribute. If the user's entry of the one group attribute for search is "restaurant," the search result is displayed as shown in FIG. 2B. In step S530, the navigation system associates the plurality of items with a plurality of graphic attributes respectively, once the plurality of items are selected. Here, different graphic attributes are assigned to the items. In S540, according to the assigned graphic attributes, the navigation system displays the plurality of items, using the plurality of graphic attributes. For example, in case of FIG. 2B, five restaurants are associated with five icons, an icon 241 is in a shape of hexagon, an icon 242 is in a shape of square, an icon 243 is in a shape of circle, an icon 244 is in a shape of pentagon, an icon 245 is in a shape of triangle. Instead of shapes, decorative frames, colors, patterns, symbols, or characters may be used. Alternatively, it is possible to have another embodiment which uses a combination of the above graphic attributes.

Figure 6:
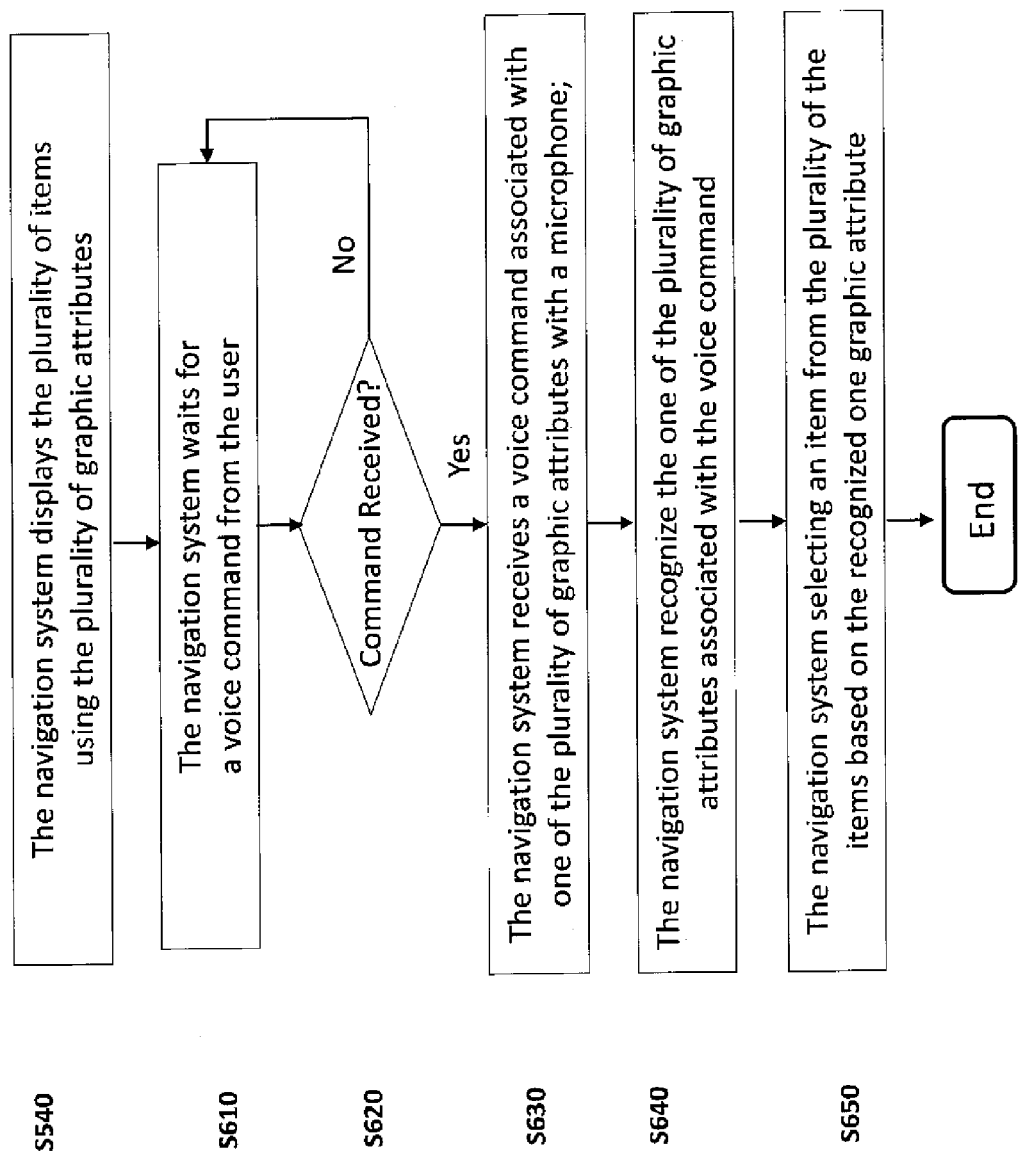
FIG. 6 is a flow chart of processing a voice command related to an icon representing a POI to be selected.

In another embodiment, a user is able to select one item among the plurality of the displayed item, by uttering a graphic attribute associated with the item. FIG. 6 is a flow chart of a procedure of the method of selecting one item among a plurality of items on the map according to one embodiment. In step S540 continued from FIG. 5, the navigation system displays the plurality of items, using the plurality of graphic attributes. In step S610, the navigation system waits for a voice command from the user. While the command has not been received as shown in step S620, the navigation system keeps waiting in step S610. Once the voice command is received from a microphone, the navigation system proceeds to step S630 where the navigation system receives a voice command associated with one of the plurality of graphic attributes with a microphone. Then, as shown in FIG. 6, the navigation system recognizes one of the plurality of graphic attributes associated with the voice command in step S640 and selects an item from the plurality of items based on the recognized one graphic attribute in step S650.

Figure 7:
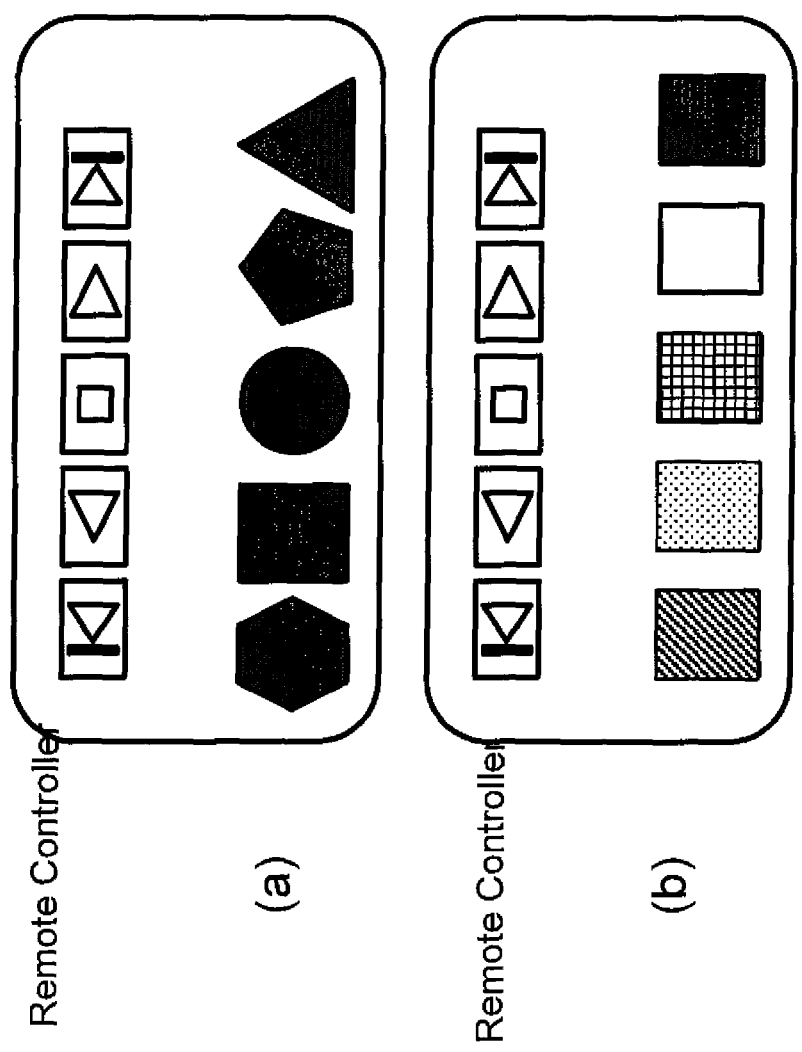
FIG. 7 is an explanatory view of a remote controller indicating buttons associated with variations of icons of one embodiment.

In another embodiment, a user is able to select one item among the plurality of the displayed items, by pressing a button associated with the desired one item, among buttons associated with the plurality of the displayed items. FIG. 7 (a) (b) is an explanatory view of a remote controller indicating buttons associated with variations of icons of one embodiment for selecting one item among a plurality of items on the map according to one embodiment. For example, FIG. 7 (a) shows a remote controller with buttons of different shapes and the user can select an item by pressing a button with a shape associated with the item to select. In another example, FIG. 7 (b) shows a remote controller with buttons of different patterns and the user can select an item by pressing a button with a pattern associated with the item to select.

Figure 8:
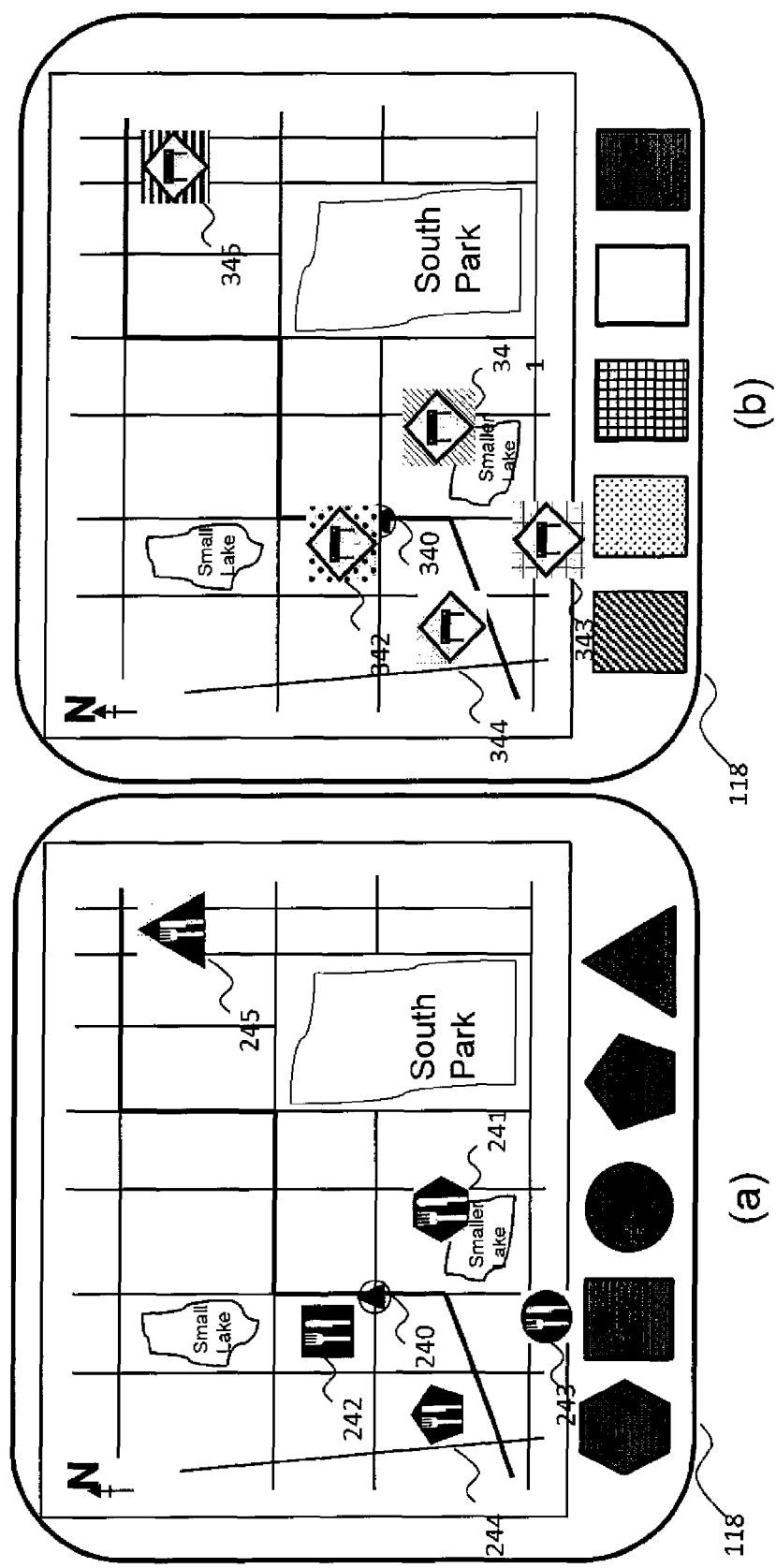
FIG. 8 is an explanatory view of a touch screen indicating a map including icons and buttons associated with the icons of one embodiment.

In another embodiment, a user is able to select one item among the plurality of the displayed items, by pressing a separate icon associated with the desired one item, among icons associated with the plurality of the displayed items. FIG. 8 (a) (b) is an explanatory view of a touch screen indicating larger icons at the bottom of the touch screen associated with variations of icons of one embodiment for selecting one item among a plurality of items on the map according to one embodiment. For example, FIG. 8 (a) shows a touch screen with touch key icons of different shapes and the user can select an item by pressing a key icon with a shape associated with the item to select. In another example, FIG. 8 (b) shows a touch screen with touch key icons of different patterns and the user can select an item by pressing a key icon with a pattern associated with the item to select. In this manner, the key to press can be easily touched by the user and less stressful to enter the touch.

Figure 9:
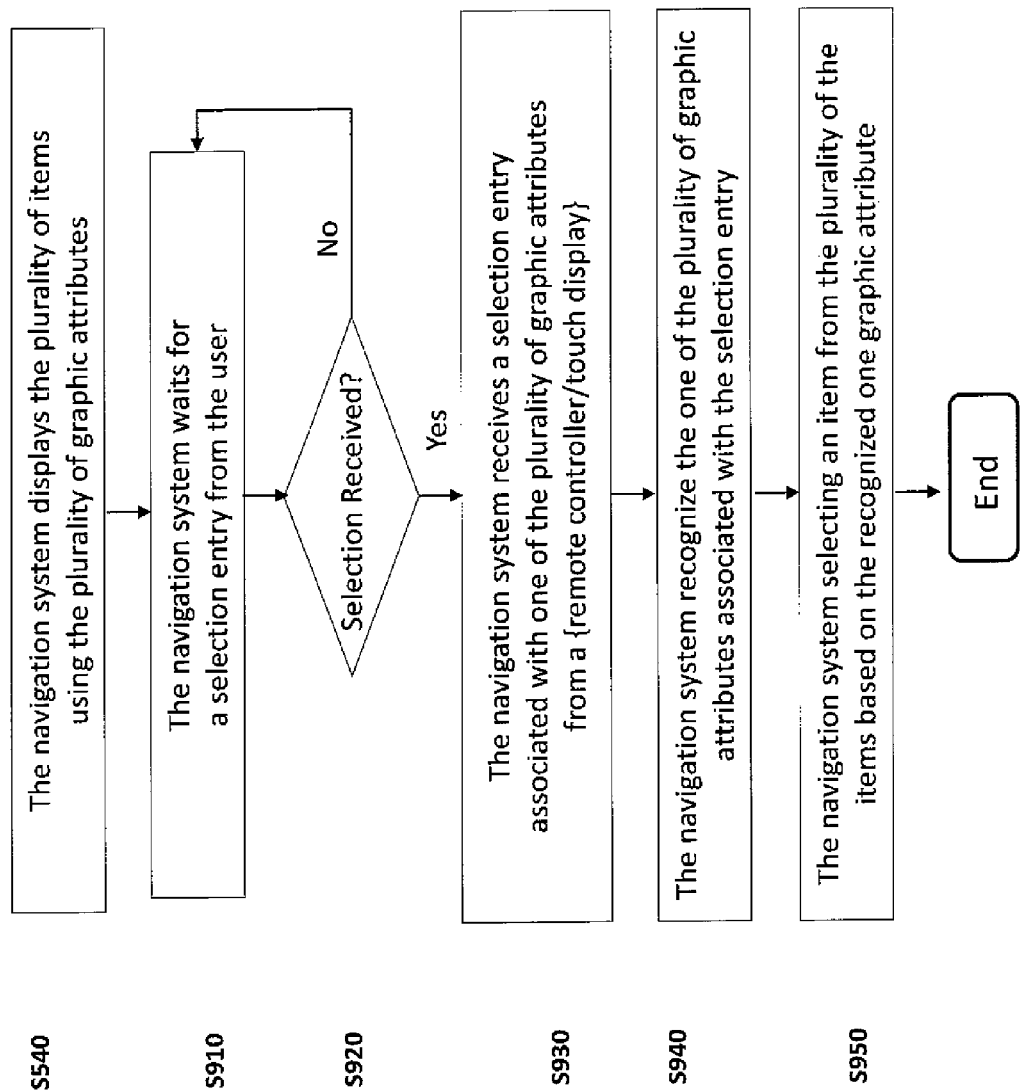
FIG. 9 is a flow chart of processing a selection entry from a remote controller or a touch screen related to an icon representing a POI.

FIG. 9 is a flow chart of a procedure of the method of selecting one item among a plurality of items on the map according to one embodiment. In step S540 continued from FIG. 5, the navigation system displays the plurality of items, using the plurality of graphic attributes. In step S910, the navigation system waits for a selection entry from the user. While the entry has not been received as shown in step S920, the navigation system keeps waiting in step S910. Once the selection entry is received from a remote controller or a touch screen, the navigation system proceeds to step S930 where the navigation system receives a selection entry associated with one of the plurality of graphic attributes with a remote controller or a touch screen. Then, as shown in FIG. 9, the navigation system recognizes one of the plurality of graphic attributes associates with the voice command in step S940 and selects an item from the plurality of items based on the recognized on graphic attribute in step S950.

Figure 10:
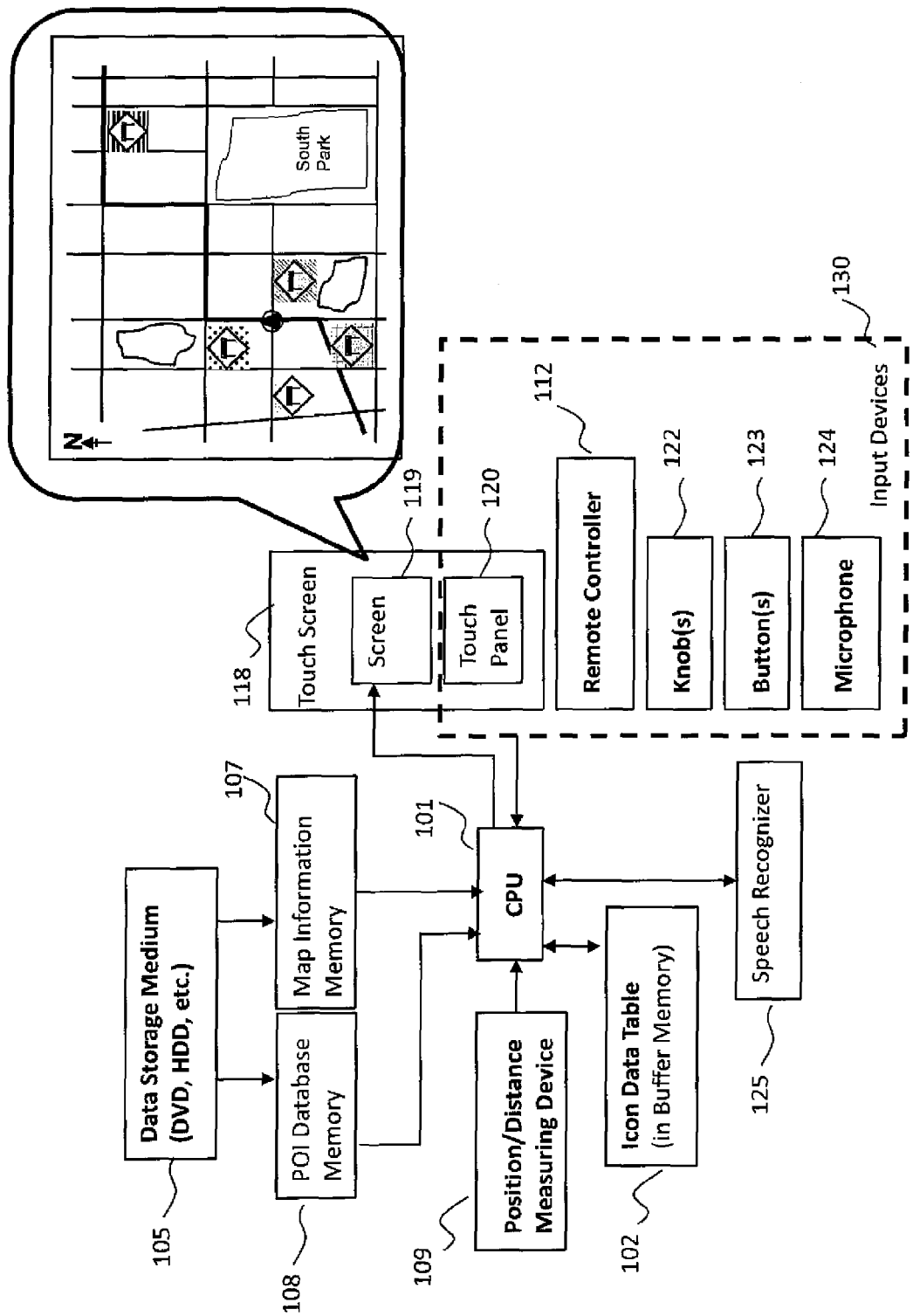
FIG. 10 is a functional block diagram showing art example of basic structure of a navigation system based on one embodiment for displaying a plurality of items on a map of a navigation system.

FIG. 10 is a functional block diagram showing an example of basic structure of a navigation system based on one embodiment for displaying a plurality of items on a map of a navigation system. The structure of FIG. 10 may be applicable to any electronic device having a navigation function which enables the electronic device to guide the user to a particular location as noted above. The apparatus for displaying a plurality of items on a map of a navigation system may include a screen 119 on a touch screen 118 for graphical user interface, and a central processing unit (CPU) 101 for controlling an overall operation in one embodiment for displaying a plurality of items on a map of a navigation system.

The block diagram of FIG. 10 further includes a data storage medium 105 such as a DVD or a hard disc for storing map data, a map information memory 107 for storing a required portion of the map data retrieved from data storage medium 105, a point of interest (POI) database memory 108 for storing a required portion of the point of interest (POI) information retrieved from the data storage medium 105, input devices 130 such as a remote controller 112 for the user to select menus, scroll the screen, change the location of the cursor on the screen, etc., as well as a microphone 124 for voice commands, a touch panel 120 for touch input, or a mechanical knob 122 or button(s) 123. A speech recognizer 125 may be coupled with the CPU 101 which handles a voice command from the microphone 124. Alternatively, this speech recognition function may be achieved by executing a speech recognition module on the CPU 101. A position measuring device 109 is coupled with the CPU 101 for detecting a current position of the user, and a buffer memory 102 for storing data such as a icon data table for processing the graphical attribute assignment display operation.

As shown in FIG. 10, the CPU 101 is able to retrieve the map data from the data storage medium 105 and the map information memory 107, and point of interest (POT) information from the data storage medium 105 and the POI database memory 108. Based on the retrieved map data and the POI information, knowing that there are plurality of items of a same group attribute is to be displayed, the CPU 101 associates the plurality of items with a plurality of graphic attributes respectively in a manner that every two items of the plurality of items are associated with different graphic attributes, thus the screen 119 is able to display the plurality of items in icons using the plurality of graphic attributes. Once the user input is received via manual input devices, such as a knob 122, button(s) 123, a remote controller 112 or a touch panel 120, the user input is processed manually. If a microphone 124 detects a user's voice command associated with one of the plurality of graphic attributes, the detected voice command is sent to a speech recognizer 125 for recognizing the one of the plurality of graphic attributes associated with the voice command. Based on the recognized voice command, an item is selected from the plurality of the items based on the recognized one graphic attribute.

In another embodiment, the method may be applied to a navigation system including a server and a client (not shown), where actual displaying and voice detection are executed at the client and the map processing can be executed at a server. In another embodiment, the navigation system may be implemented as a mobile apparatus, such as a smartphone and its application (not shown). Alternatively, in another embodiment, the system displaying POIs or traffic conditions on a map may simply be installed on a standalone static machine.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of displaying a plurality of items of a search result of a navigation system, the method comprising:
    measuring, by a position measuring device which includes a GPS (Global Positioning System) receiver, a present user position based on GPS signals and moving distance and direction sensor signals;
    selecting the plurality of items of a same group attribute of the search result where the items are related to geographic positions including the present user position specified during operations of the navigation system;
    associating, by a processor, the plurality of items with a plurality of graphic attributes respectively in a manner that every two items of the plurality of items are associated with different graphic attributes, thereby assigning a unique graphic attribute to each item, and wherein the selected plurality of items of the same group attribute of the search result has an identical icon representing the same group attribute of the search result; and
    displaying, on a screen of the navigation system, the plurality of items using the plurality of graphic attributes along with the identical icon representing the same group attribute of the search result.

2. The method of claim 1, wherein the plurality of graphic attributes are related to shapes.

3. The method of claim 2, wherein the shapes are different decorative frames.

4. The method of claim 1, wherein the plurality of graphic attributes are related to colors.

5. The method of claim 1, wherein the plurality of graphic attributes are related to patterns.

6. The method of claim 1, wherein the plurality of graphic attributes are related to symbols.

7. The method of claim 1, wherein the plurality of graphic attributes are related to characters.

8. The method of claim 1, wherein the plurality of graphic attributes are related to a combination of at least two of shape, color and patterns, symbols and characters.

9. The method of claim 8, wherein any two items have different graphic attributes of at least shape, color, pattern, symbol and character.

10. The method of claim 1, wherein the group attribute is a category of Point of Interest (POI).

11. The method of claim 1, wherein the group attribute is related to one of traffic conditions.

12. The method of claim 11, wherein the one of traffic conditions comprises at least one of traffic incidents, traffic accidents, traffic congestions, road or lane closures, detours, criminal situations, natural disasters, hazards, constructions, animal crossings, and vehicle crossings.

13. The method of claim 1, further comprising:
    receiving a voice command associated with one of the plurality of graphic attributes with a microphone;
    recognizing the one of the plurality of graphic attributes associated with the voice command; and
    selecting an item from the plurality of the items based on the recognized one graphic attribute.

14. The method of claim 1, further comprising:
    displaying buttons associated with the plurality of graphic attributes on a controller at a proximity of a hand of a user;
    receiving a button entry associated with one of the plurality of graphic attributes;
    recognizing the one of the plurality of graphic attributes associated with the button entry; and
    selecting an item from the plurality of the items based on the recognized one graphic attribute.

15. The method of claim 14, wherein the controller is a touch screen.

16. A navigation system comprising:
    a position measuring device which includes a GPS (Global Positioning System) receiver and is configured to measure a present user position based on GPS signals and moving distance and direction sensor signals;
    a processor configured to select a plurality of items of a same group attribute of a search result where the items are related to geographic positions including the present user position specified during operations of the navigation system, and to associate the plurality of items with a plurality of graphic attributes; and a display configured to display the plurality of items of the search result of the navigation system;

wherein the processor is configured to associate the plurality of items with a plurality of graphic attributes respectively in a manner that every two items of the plurality of items are associated with different graphic attributes, thereby assigning a unique graphic attribute to each item, and wherein the selected plurality of items of the same group attribute of the search result has an identical icon representing the same group attribute of the search result;

wherein the display is configured to display the plurality of items using the plurality of graphic attributes along with the identical icon representing the same group attribute of the search result.

17. The system of claim 16, wherein the navigation system is a vehicle navigation system.

18. The system of claim 17, wherein the system is installed on a smartphone.

* * * * *